Sept. 17, 1968          J. J. DINEEN          3,401,520
BOOST COMPRESSOR
Filed Feb. 16, 1966          2 Sheets-Sheet 1
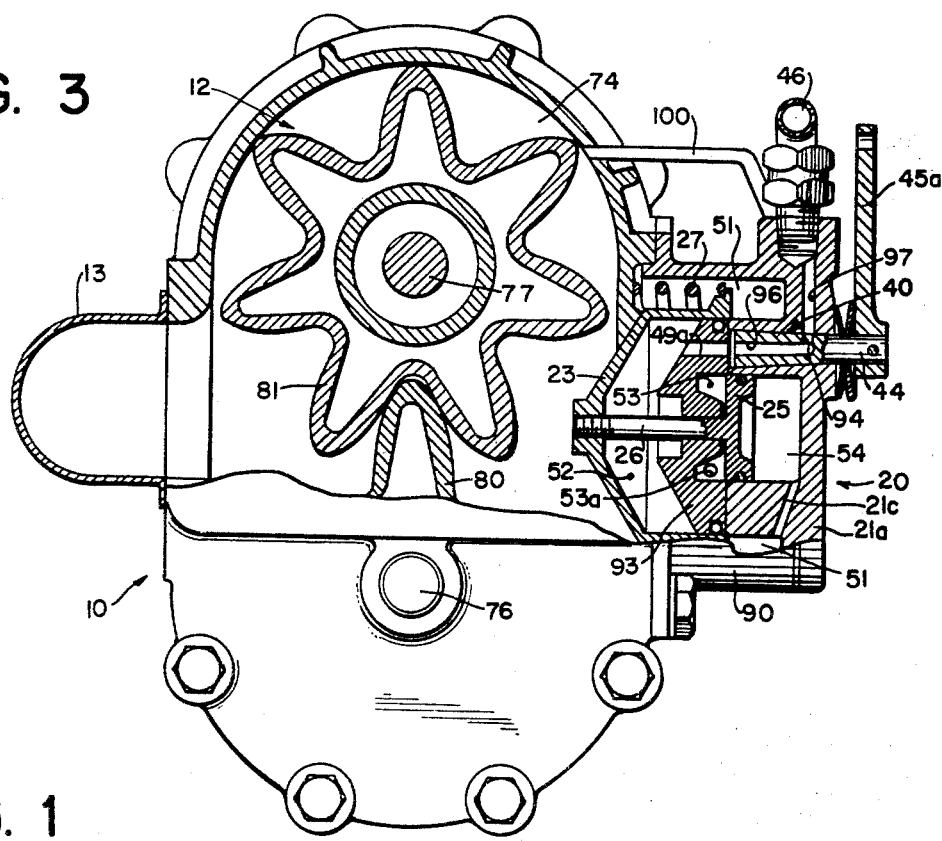
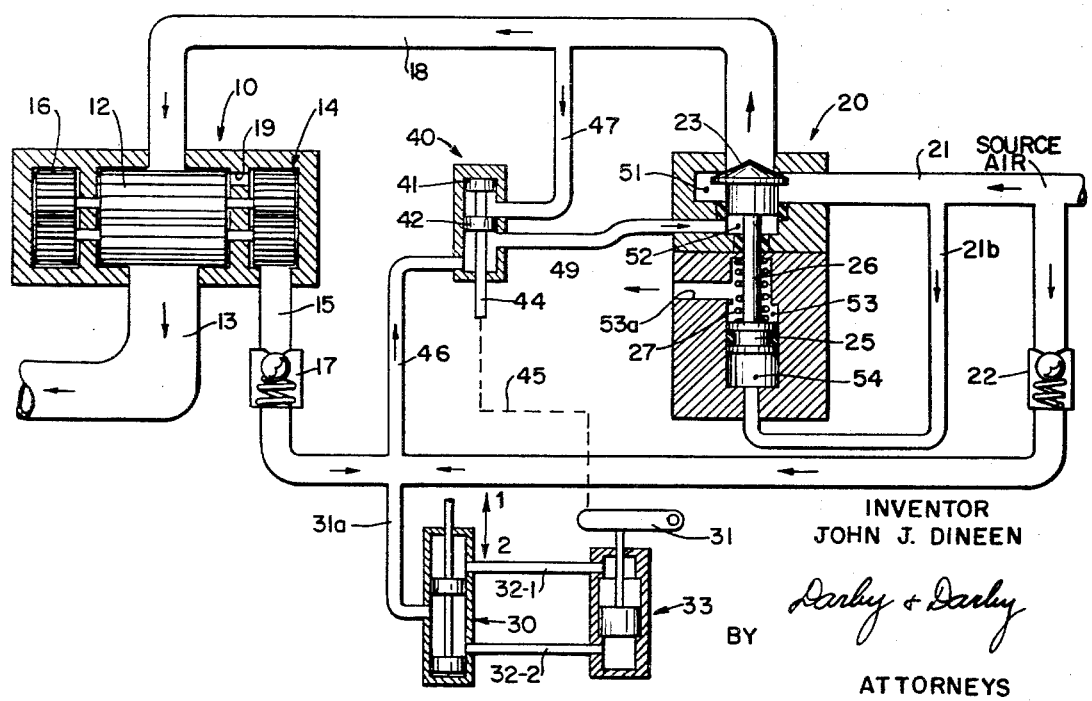
INVENTOR
JOHN J. DINEEN
BY *Darby & Darby*
ATTORNEYS United States Patent Office 3,401,520
Patented Sept. 17, 1968

3,401,520
BOOST COMPRESSOR
John J. Dineen, East Northport, N.Y., assignor to Fairchild Hiller Corporation, Bay Shore, N.Y., a corporation of Maryland
Filed Feb. 16, 1966, Ser. No. 527,829
13 Claims. (Cl. 60—51)

ABSTRACT OF THE DISCLOSURE

Apparatus for operating an aerodynamic surface which is movable from a first to a second position including a boost compressor and a supply valve located between a fluid pressure source and the boost compressor. A control arrangement is provided which is responsive to the position of the aerodynamic surface to close the supply means when the surface is in the first position to thereby shut off the boost compressor and to open the supply valve when the surface is in the second position to operate the boost compressor to provide a higher pressure fluid to return the surface from the second to the first position.

---

This invention relates to improvements in pneumatic actuation systems used for overcoming substantial opposition forces to effect the operation of a particular mechanism.

Many applications exist where a pneumatic system is to be used to overcome substantial opposing forces to actuate a particular mechanism. Such systems are frequently used in aircraft to actuate dive brakes, flaps, thrust reversing devices and other similar equipment all of which operate against opposing aerodynamic forces when the aircraft is moving. In a typical aircraft installation, space and weight considerations are dominant factors in the design of such actuating systems and, accordingly, they cannot easily be afforded the luxury of surplus capacity. Consequently, improvements in the equipment operated by the actuating system are frequently prevented from reaching reality in a particular aircraft and the maximum operating capability of the aircraft is often unrealized due to the inability of increasing the capacity of the actuating system within the weight and space limitations imposed by the original aircrcaft design.

As an example of this consider an aircraft which may be inherently capable of attained higher operating speeds. However, such higher speeds would require the use of aerodynamic dive brakes, or flaps, or any of a number of components, which would have to be actuated by the original actuation system against greater aerodynamic forces than the original system was designed to work against. Consequently, operation of the aircraft at such higher speeds could easily exceed the capability of the originally designed actuation system or relegate its operation to marginal performance.

As a further example, in the operation of jet propelled aircraft it is usually necessary to employ reverse thrust to assist in retarding the landing run of the aircraft after touch down. With the advent of higher speeds brought about by improvements in propulsion systems and other aircraft components, the use of mechanisms for producing the reverse thrust becomes indispensable in bringing aircraft roll speeds down rapidly to safely land the aircraft without going to perhaps another alternative such as extending the landing runways to exorbitant lengths. Moreover, the landing of aircraft at higher elevations airports and/or under high load conditions necessitates higher aircraft approach and touchdown speeds leaving little discretion to the pilot as to whether reverse thrust should be utilized.

One common thrust reversing mechanism used on jet aircraft is in the form of thrust reverser doors or "claimshells" in the engine nacelles. When the doors are closed, in the so-called "cruise" position, the thrust from the engine is used in the normal manner to propel the aircraft forward. With the doors open all or a portion of the thrust is directed in a substantially reverse direction to retard the forward motion of the aircraft. Since the thust reversing device is situated in a relatively high temperature environment in the engine nacelle, pneumatic actuation systems are generally used in preference to other types to actuate the device due to the relative insensitivity of these systems to elevated temperatures. In addition a source of pneumatic pressure is readily available in the form of air bled from the compressor portion of the jet engine.

In cases where aircraft performance has been improved, either through operating experience, or by advances in technology, many of the pneumatic actuating system originally fitted into a particular aircrcaft have demonstrated less than satisfactory performance. Also, many originally installed pneumatic actuating systems have operated somewhat marginally in some situations.

In the case of thrust reverse actuation for example, utilization of the thrust reverser mechanism corresponds in point in time with reduced engine power and brake utilization to reduce the aircraft rolling speeds. It has been found that the pneumatic pressure reduction which coincides with the engine power reduction is generally reflected in a reduction in pneumatic pressure causing marginal, or at best sluggish, operation of the pneumatic actuation system during the retraction of the thrust reverser doors to the "cruise" position. Consequently, it has become common practice for aircraft pilots to race the engine during landing runs to generate sufficient pneumatic pressure to return the reverser doors to the "cruise" position. This practice causes increased rate of brake wear, increased fuel consumption and increased length of landing run.

Inadvertent in-flight actuation of thrust reversers has occurred occasionally causing an added difficulty in that the actuation systems generally are not capable of overcoming the increased aerodynamic loads generated by the speed of the aircraft in flight to return the thrust reversers to the "cruise" position. As a result, in order to recover from a situation where the reversers have been accidently operated, the pilot must slow the aircraft as much as possible. In practice this means that the aircraft must be flown slightly above stall speed, the speed at which the aircraft would be incapable of flight, thereby necessitating a somewhat elaborate and cumbersome procedure to bring the airplane to what is customarily referred to as a "dirty" condition. This generally entails a power reduction with respect to the remaining aircraft engines that are generating power and the extension of flaps and wheels which will permit the aircraft to be flown just above the stall speed. In addition to the involved procedures followed by the crew to bring the aircraft to this condition, control of most aircraft at these low speeds is at best marginal.

The present invention is directed to apparatus for increasing the available pneumatic pressure in an existing pneumatic actuation system to enable the system to overcome any deficiencies which would ordinarily prevent its satisfactory performance under increased loads. The apparatus of the present invention accomplishes this without requiring substantial alteration of the existing pneumatic system.

In accordance with the invention a boost compressor is provided in the existing pneumatic actuation system for stepping up an available low pressure input into a higher pressure output. In a preferred embodiment of the invention the boost compressor is formed by two positive displacement gear pumps one of which serves as a motor and the other of which acts as a compressor. The volumetric ratio of the motor and compressor is selected so that an input fluid at a relatively low pressure, for example air bled from a jet engine, is compressed to a higher output pressure. An automatic control system is also provided so that when the equipment to be actuated by the pneumatic system is in a first position the boost compressor is automatically shut off and, after the equipment has been moved to a second position from which it is to be returned to the first position, the boost compressor is automatically turned on to produce the higher pressure fluid to accomplish the return movement. After the equipment returns to its first position, the boost compressor is again automatically shut off.

It is therefore an object of the present invention to provide a boost compressor apparatus for an existing pneumatic system.

Another object is to provide automatically controlled boost compressor apparatus for producing pneumatic fluid at a relatively high pressure in response to fluid from a lower pressure source.

A further object of the invention is to provide a boost compressor apparatus formed by two positive displacement gear pumps.

Still another object is to provide a boost compressor for a pneumatic actuating system, the system being responsive to predetermined displacements of the equipment to be actuated to automatically turn the compressor on and off.

Other objects and advantages of the present invention will become more apparent upon reference to the following specification and annexed drawings in which:

FIG. 1 is a partial flow and partial schematic diagram illustrating the operation of the boost compressor and automatic control system;

FIG. 3 is a front elevational view of the compressor of FIG. 2 shown partly in section along lines 2—2 of FIG. 2.

Figure 2:
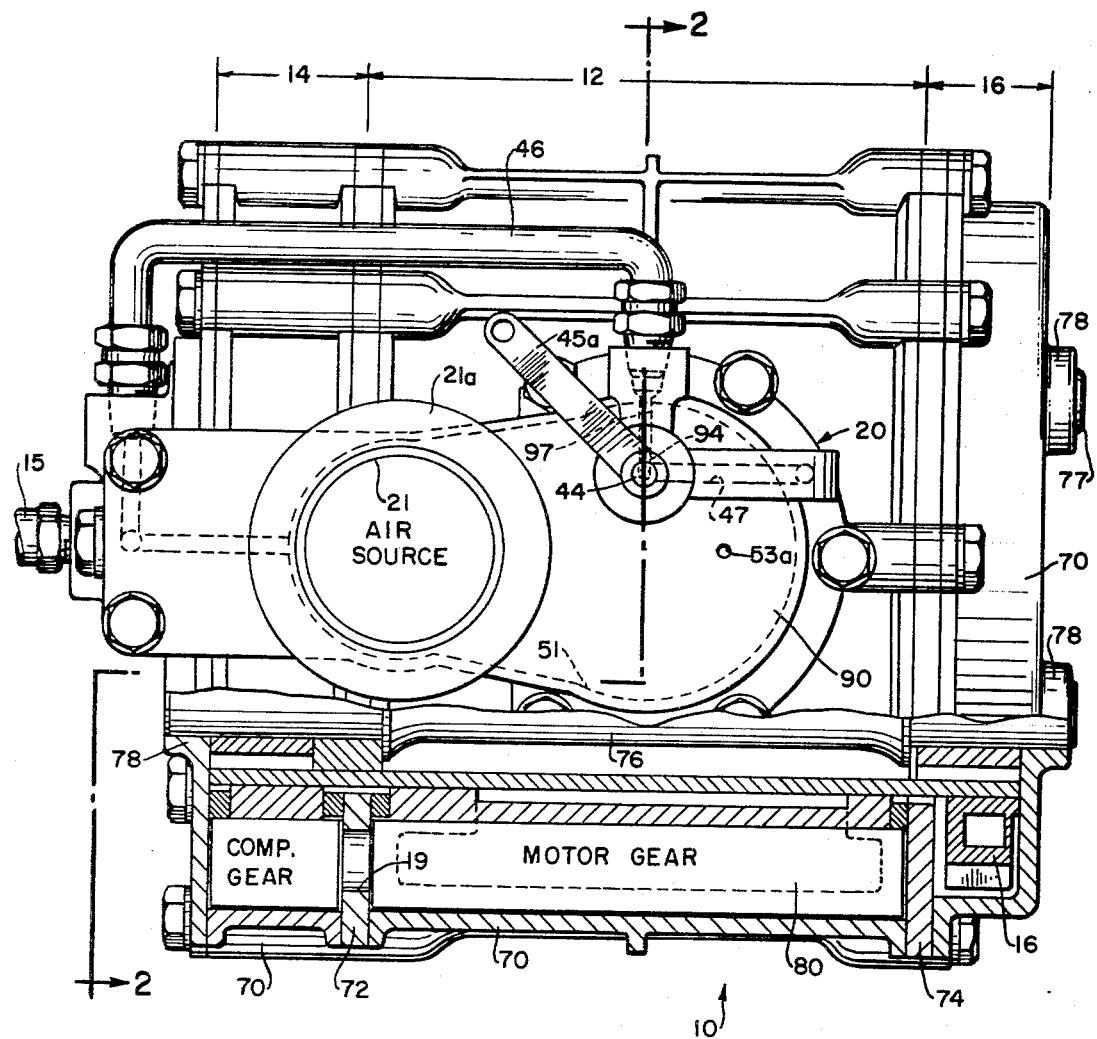
FIG. 2 is a side elevational view of the boost compressor with sectioned portions.

FIGURE 1 shows in schematic form the general operation of the boost compressor apparatus and its automatic control system. Here, a pneumatic boost compressor 10 is formed by a motor unit 12, a compressor unit 14 and a set of timing gears 16. The motor and compressor units 12 and 14 are supplied with fluid from a suitable source, for example air bled from a jet engine, at a relatively low pressure from a conduit 18 through a pressure control and shut off valve 20. This valve receives air from the source through a conduit 21b. A port 19 is provided between the motor and compressor units 12 and 14 of the booster so that they both receive the air when valve 20 is open. The input air turns motor unit 12 which drives the compressor unit 14 and causes it to have an output of higher pressure air in outlet 15. The details of booster 10 are described below.

When the booster 10 is running, motor unit 12 is vented by an outlet conduit 13. The high pressure output fluid of the compressor unit 14 in conduit 15 passes through a check valve 17 to a control valve 30 which determines two operating positions of the equipment to be operated. In FIG. 1, this equipment is shown schematically as being a control surface 31 of an aircraft. When the booster 10 is inoperative the lower pressure source air passes through check valve 22 and conduit 31a to valve 30. With valve 30 in position "1," low pressure air from the source is applied through conduit 21 and a check valve 22 to control valve output branch conduit 32–1 into a pneumatic actuating cylinder 33. Fluid in branch conduit 32–1 moves the actuating piston down and it pulls surface 31 from a first (normal) position to a second position. This second position is where the greater forces are encountered. When valve 30 is moved to position "2," high pressure air is supplied from check valve 17 to a control valve output branch conduit 32–2 and to the actuating cylinder 33 to move the surface 31 back to the first position against an external force acting on surface 31. As is explained below, booster 10 is automatically turned on when surface 31 moves from the first to the second position so that the higher pressure fluid will be available to return the surface to the first position.

A pilot valve 40 operates the pressure control and shut off valve 20 to automatically start and stop the compressor 10. Pilot valve 40 has spools 41 and 42 on a shaft 44 which is connected by a suitable mechanical linkage 45 to the control surface 31 or its actuator. Valve 40 is therefore responsive to the position of the control surface. A conduit 46 supplies low pressure source air to the bottom of spool land 42 when the booster 10 is off and high pressure air when the compressor is running. A second inlet conduit 47, which branches from conduit 18, supplies low pressure source air to pilot valve 40 when the shut off valve 20 is open.

Pilot valve 40 has a single outlet over a conduit 49 to chamber 52 of shut off valve 20. Valve 20 has a poppet valve 23 whose head moves in a chamber 51. The inlet chamber 51 is the source air from conduit 21 and the outlet is the air supply conduit 18 for compressor 10. The base of the poppet valve 23 moves in chamber 52 which receives fluid from an outlet conduit 49 of pilot valve 40. A piston 25 is connected to the base of the poppet valve by a shaft 26. The poppet valve is biased by a spring 27 located in a third valve chamber 53 around the shaft 26. The spring engages the upper wall of chamber 53 and the upper face of the piston 25. Chamber 53 has a vent 53a to neutral pressure. A fourth chamber 54 in valve 20 below the piston 25 receives source air from conduit 21.

Considering the operation of the system, with the pilot valve 40 moved by the mechanical linkage 45 to the position shown, for example with the control surface in the first (normal) operating position (such as the "cruise" position for a thrust reverser door) source air passes through from conduit 21 through check valve 22, into pilot valve 40 and out conduit 49 to shut off valve chamber 52 to act on the lower face of the poppet valve base to urge it up. At the same time, source air from conduit 21 is supplied to control valve chamber 54 and acts against the lower face of piston 25 also to urge the poppet valve up. The sum of the pressures in chambers 52 and 54 is sufficient to overcome the opposite (downward) biasing force of spring 27, push the poppet valve 23 all the way up and close the passage through chamber 51 between conduits 18 and 21. Since the booster unit 10 does ont receive any air, it is inoperative. Source air from conduit 21 is blocked from entering the compressor outlet 15 by the check valve 17 at this time.

When valve 30 is operated so that source air can enter branch conduit 32–1 and move the control surface toward the second position (for example the thrust reverser doors open) the mechanical linkage 45 is also operated and it begins to move down the spools 41 and 42 of pilot valve 40. Downward movement of the spool first brings conduits 47 and 49 into communication in accordance with the space provided between the two spools 41 and 42. This tends to equalize the pressures in chambers 51 and 52 on both sides of the poppet valve 23 and it now opens under the influence of biasing spring 27. It should be understood that spring 27 is selected to have sufficient force to open valve 23 when source pressure is applied only to chamber 54.

When the poppet valve 23 opens source pressure is supplied over conduit 18 to the booster unit 10 causing it to start. Relatively high pressure air begins to be available in the outlet 15 and is supplied through check valve 17 and branch conduit 1 to aid in moving the control surface 31 to the second position and to hold it there.

When the control surface is fully in the second position, linkage 45 brings the spools of valve 40 substantially all the way down. This blocks off the high pressure air in conduit 46 from pilot valve 40. Therefore, poppet valve 23 is held open by spring 27 and the booster unit 10 continues to run.

With booster 10 running the high pressure air is available to move the control surface back to the first position. This is accomplished by operating valve 30 to direct the high pressure air to conduit 32–2. When the control surface moves back to the first position, linkage 45 moves the spool valve 40 up to the position shown in FIG. 1. The high pressure air in conduit 46 now passes through pilot valve outlet conduit 49 into the chamber 52 and it has sufficient pressure to move poppet valve 23 up to close the passage between conduits 18 and 21 and thereby shut off the booster. It should be understood that high pressure air is available to move the control surface 31 back to the first position which means that the actuation system can operate effectively against larger aerodynamic forces than would be possible if only the low pressure source air was available.

An automatic shut off is provided for the booster 10 when the source pressure reaches a predetermined point. For example, consider that the booster is operating and that there is communication between conduits 47 and 49 with the spool valve 40 fully down. At this time, the only thing holding poppet valve 23 open is the pressure balance across it which is offset by the bias of spring 27. In this condition when the source pressure in chamber 54 from conduit 21b acting against the bottom of piston 25 is sufficient to overcome the bias of spring 27, poppet valve 23 moves up to close the passage to conduit 18 and shut off the booster. In general, the bias of spring 27 is selected so that the poppet valve can be closed when the source pressure reaches a predetermined level which is considered to be adequate to operate the control under normal conditions. In a typical embodiment shut off valve 20 is sized so that in normal operation the poppet valve is full open at an engine bleed air pressure of 40 p.s.i. and closes at 50 p.s.i.

FIGS. 2 and 3 show the details of the booster unit 10 and a practical embodiment of the valving system formed by valves 20 and 40 of FIG. 1. The same reference numerals are used where applicable. Booster unit 10 has an outer housing 70 with a first internal wall 72 dividing it into the respective portions for the motor and compressor portions 12 and 14 and a second internal wall 74 to isolate the timing gears 16 from the other portions of the booster.

A pair of parallel shafts 76 and 77 extend the length of the housing. Shafts 76 and 77 are held in suitable bearings 78, such as caged roller bearings (not shown in detail) one mounted at each end of each shaft in the housing end walls. Shafts 76 and 77 carry the components for the motor and compressor units 12 and 14. In a preferred embodiment of the invention, positive displacement type gear pumps are used both for the motor and compressor units. Each unit has a mating set of gears, one on each of the shafts 76 and 77. The two gear sets are generally of the same construction, with the exception that the overall length of the gears for the motor unit set is longer than that of the set for the compressor unit. A portion of the motor gear set is shown in FIG. 3 and it is formed by two mating gears 80 and 81 on the respective shafts 76 and 77. A similar set of gears of smaller length is provided for the compressor unit. Because of the ratio of the lengths of the gear sets and their deployment on the common shafts 76 and 77, source air applied to the motor unit rotates its gear set, rotating shafts 76 and 77 to drive the gear set of the compressor unit and thereby produce compression of the source air in the compressor unit 14.

Shafts 76 and 77 also carry a set of timing gears 16 in the compartment between the end wall of the housing and the internal wall 74. The timing gears 16 are sized to prevent contact between the respective mating gears of the motor and compressor gear sets. The timing gears preferably have a finer diametral pitch than the motor and compressor gears, to reduce backlash. The single gear mesh of the timing gears 16 obviates the need for close tolerances over the full length of the motor and compressor gears. Such close tolerance control would otherwise be necessary because the drive alternates between mating gears, causing a rapid reversal of loads on the gear teeth. Separation of the mating motor and compressor gears also provides clearance for the ingestion of contaminants and simplifies the lubrication task. A high temperature dry film lubricant is preferably utilized to provide protection against wear, gauling and fretting corrosion.

The shut-off valve 20 and the pilot valve 40 of FIG. 1, are combined in FIGS. 2 and 3 in a single valve housing 90 located on the side of the housing 70. A housing 21a for the inlet conduit 21 from the source pressure is also located on the booster housing 70. Inlet housing 21a is formed with three passages, one each to the chambers 51 and 54 of the shut off valve and the other corresponding to conduit 47 to the pilot valve. Source pressure air applied through the inlet housing 21a also passes through the port 19 in wall 72 to both the motor and compressor units 12 and 14, as in FIG. 1.

The valve assembly of FIGS. 2 and 3 in housing 90, includes the majority of the components of the schematic diagram of FIG. 1, although in somewhat different form. In FIGS. 2 and 3, the head of poppet valve 23 is hollow and generally conical in shape. The head opens and closes chamber 51, which here is shown in direct communication with the interior of the booster unit 10. Poppet valve 23 is biased by spring 27 to telescope over a stationary mating piece 93 with a central bore through which shaft 26 of poppet valve 23 passes. The shaft 26 terminates in a piston 25. Chamber 52 is formed between the inner wall of poppet 23 and the outer wall of stationary piece 93 while the piston 25 separates chambers 53 and 54. Chamber 53 is vented to neutral pressure by passage 53a.

The movable shaft 44 of the pilot valve 40 is shown in FIGS. 2 and 3 as a rotatable member with an axial bore passage 96 and transverse inlet passage 94 through half of the shaft diameter. Rotatable shaft 44 is moved by a handle 45a which is connected to the control surface linkage 45. Inlet passage 94 communicates with the motor unit pressure via conduit 47 or the booster unit high pressure output from conduit 46 via passage 97 depending upon the position of the handle. Conduit 46 is connected to a fitting which communicates with the outlet passage 15 of the compressor unit 14. Passage 49a, corresponding to conduit 49 of FIG. 1, is provided in stationary piece 93 to supply the pressure signal in passage 94 of shaft 44 to chamber 52. Chambers 51 and 54 receive source air pressure at all times through inlet housing passages 21 and 21b. The check valves 17 and 22 are not shown in FIGS. 2 and 3 but they can be located any suitable place within the unit 10.

With the valve assembly in housing 90 shown in the same condition as in FIG. 1, actuator handle 45a brings inlet passage 94 of shaft 44 into communication with the source air pressure in conduit 46 to apply it to chamber 52. The source pressure air applied to chamber 54 and that in chamber 52 is sufficient to overcome the preload of the spring 27 to move the poppet valve 23 to close off chamber 51. This keeps the compressor off.

When actuator handle 45a is moved clockwise, the inlet passage 94 of shaft 44 is moved away from passage 97 into communication with conduit 47 and the booster (off) pressure is now applied through passages 96 and 49 to chamber 52. Since the pressures on both faces of the head of the poppet valve 23 now tend to be equalized, the spring 27 moves the poppet valve over stationary piece 93 permitting the air in chamber 51 to pass to the interior of the booster 10 and turn it on. In one embodiment of the invention, with the actuator handle 45a in its extreme clockwise position, the inlet passage 94 of shaft 44 is closed off against a wall of housing 90 from the source pressure in conduit 46 so that the spring 27 can keep the poppet valve open and the booster can continue to operate.

With the booster running the outlet 15 of the compressor unit 14 supplies the high pressure air to the control valve 30, as previously described. When the control valve 30 is operated to bring the control surface back to its normal position the actuator handle 45a is moved back to the position shown in FIG. 2 with conduit 46 and passage 94 in communication. Source pressure is again applied to chamber 51 to close poppet valve 23 and shut off the compressor.

An inlet pressure control arrangement also can be utilized with the present invention. Here, an additional passage 100 is provided from the motor unit 12 to the valve houseing 90 adjacent the inlet passage 94 of shaft 44. In this embodiment, when the actuator handle 45a is in the extreme clockwise position and the booster is operating, inlet 94 communicates with passage 100 so that the pressure in the compartment of motor unit 12 is applied to chamber 52. The pressure in chamber 52 combined with the source pressure in chamber 54 now operate the poppet valve against spring 27 to control the output of the booster unit. This arrangement controls the operation of the booster at its inlet, in addition to the control provided by shaft 44 of the pilot valve.

While preferred embodiments of the invention have been described above, it will be understood that these are illustrative only, and the invention is limited solely by the appended claims.

What is claimed is:

1. A booster compressor system for an aircraft operating from a source of fluid pressure and responsive to the movement of an aerodynamic surface from a first to a second position where said aerodynamic surface is subjected to increased areodynamic forces comprising:
    booster compressor means,
    a supply valve connected between the source of fluid and the booster compressor means,
    means receiving fluid from the source for initiating the movement of said aerodynamic surface from said first to said second position,
    and control means operated by said aerodynamic surface and responsive to the position of said aerodynamic surface to close said supply valve when said aerodynamic surface is in said first position and to open said supply valve to permit fluid to flow to and operate the booster compressor when the aerodynamic surface moves from the first to the second position, the higher pressure fluid produced when the booster compressor is operating when the aerodynamic source is in the second position being available to return the aerodynamic surface against the action of the increased aerodynamic forces to said first position.

2. The system of claim 1 wherein said control means operates to start operation of the booster compressor means before the aerodynamic surface fully reaches the second position, and means for applying the higher pressure fluid to said aerodynamic surface to aid it in moving to said second position.

3. A booster compressor system responsive to the movement of apparatus from a first to a second position comprising:
    a booster compressor,
    a supply valve connected between a source of fluid whose pressure is to be boosted and the booster compressor,
    and pilot valve means connected to said apparatus and said supply valve and responsive to the apparatus position to supply fluid to close said supply valve when said apparatus is in said first position and to supply fluid to open said supply valve to permit fluid to flow to and operate the booster compressor when the apparatus moves from the first to the second position, the higher pressure fluid produced when the booster compressor is operating when the apparatus is in the second position being available to return the apparatus to said first position.

4. The system of claim 1 further comprising means for selectively applying fluid from the source to move the aerodynamic surface from the first to the second position and fluid at a higher pressure from the booster compressor to move the aerodynamic surface from the second to the first position.

5. The system of claim 1 further comprising the booster compressor having motor and compressor portions, and means connecting the supply valve to said booster compressor to apply the fluid from the source to both said motor and compressor portions.

6. The system of claim 5 further comprising means for closing the supply valve when the pressure of the fluid in the motor portion of the booster compressor and the pressure of the fluid in the source have less than a predetermined differential.

7. A booster compressor system as set forth in claim 1 wherein said booster compressor further comprises:
    a housing formed with motor and compressor sections and an inlet for fluid from a source into both said housing sections,
    a pair of shafts rotatably mounted in said housing,
    and one gear of a set of mating gears mounted on a respective shaft in each section for rotation therewith, each gear set having a different fluid displacement, whereby fluid entering the motor section drives the gear set in that section to rotate the shafts and drive the gear set in the compressor section.

8. A valve for a booster compressor system operating from a fluid supply source and responsive to the position of auxiliary apparatus comprising:
    a supply valve, said supply valve having
    a housing with a first chamber forming a first passage from the fluid supply source to the booster compressor,
    a valve member for opening and closing said first passage,
    second and third chambers in said housing each having a portion of the valve member located therein,
    means urging said valve member in a first direction in said first chamber, the combined pressures in said second and third chambers acting on said valve member determining the degree of opening of the first passage by the valve member,
    and means responsive to the position of said apparatus for controlling the pressure of the fluid in at least said second chamber.

9. A valve as set forth in claim 8 further comprising:
    means for supplying fluid at a substantially constant pressure to said third chamber, said apparatus position responsive means operating to change the pressure in said second chamber when the apparatus moves from a first toward a second position so that the urging means moves the valve member to open said first passage to supply fluid to the boost compressor.

10. A valve as set forth in claim 9 wherein said position responsive means established the pressure in said second chamber to hold the valve member in a position to close said first passage when the apparatus is in said first position to thereby shut off the fluid supply to the booster compressor.

11. A valve as set forth in claim 10 wherein said position responsive means comprises a pilot valve having means for connecting its control member to the auxiliary apparatus, said pilot valve operating to supply reduced pressure to said second chamber when the apparatus is in the second position.

12. A booster compressor system as in claim 1 wherein said supply valve comprises:
- a housing with a first chamber forming a first passage from the fluid supply source to the booster compressor,
- a valve member for opening and closing said first passage,
- second and third chambers in said housing each having a portion of the valve member located therein,
- means urging said valve member in a first direction in said first chamber, the combined pressures in said second and third chambers acting on said valve member determining the degree of opening of the first passage by the valve member,
- and said means for opening and closing the supply valve is a pilot valve responsive to the position of the apparatus for controlling the pressure of the fluid in at least said second chamber.

13. A booster compressor system as in claim 12 wherein said booster compressor comprises:
- a pair of shafts rotatably mounted in said housing,
- and one gear of a set of mating gears mounted on a respective shaft in each section, each set having a different fluid displacement, whereby fluid entering the motor section drives the gear set in that section to rotate the shafts and drive the gear set in the compressor section.

References Cited
UNITED STATES PATENTS

| | | | |
|---|---|---|---|
| 995,263 | 6/1911 | Laursen | 103—48 |
| 2,264,375 | 12/1941 | Hill, et al. | 60—51 |
| 2,751,752 | 6/1956 | Metcalf | 60—52 |
| 2,910,948 | 11/1959 | Betzen | 103—118 |
| 2,945,677 | 7/1959 | Kammerer, Jr., | 60—52 |
| 3,016,707 | 1/1962 | Williamson | 60—51 |
| 3,270,951 | 9/1966 | Reed | 230—9 |

WILLIAM L. FREEH, *Primary Examiner.*